United States Patent
Zhang et al.

(10) Patent No.: US 9,544,431 B2
(45) Date of Patent: Jan. 10, 2017

(54) SYSTEM AND METHOD FOR INTELLIGENT CALL BLOCKING WITH BLOCK MODE

(71) Applicant: Shanghai Chule (CooTek) Information Technology Co. Ltd., Shanghai (CN)

(72) Inventors: Kan Zhang, Shanghai (CN); Meng Zhang, Shanghai (CN); Wenyu Ye, Shanghai (CN); Teng Ren, Shanghai (CN)

(73) Assignee: SHANGHAI CHULE (COOTEK) INFORMATION TECHNOLOGY CO. LTD., Shanghai (CN)

( * ) Notice: Subject to any disclaimer, the term of this patent is extended or adjusted under 35 U.S.C. 154(b) by 0 days.

(21) Appl. No.: 14/597,325

(22) Filed: Jan. 15, 2015

(65) Prior Publication Data

US 2015/0140977 A1    May 21, 2015

(51) Int. Cl.
*H04M 3/42* (2006.01)
*H04M 3/436* (2006.01)
*H04W 4/16* (2009.01)

(52) U.S. Cl.
CPC ......... *H04M 3/436* (2013.01); *H04M 3/42059* (2013.01); *H04W 4/16* (2013.01)

(58) Field of Classification Search
CPC .................................................. H04M 3/436
USPC ....................................................... 455/415
See application file for complete search history.

(56) References Cited

U.S. PATENT DOCUMENTS

| | | | | |
|---|---|---|---|---|
| 8,554,835 B1* | 10/2013 | Williams | ............... | G06Q 50/01 705/319 |
| 8,639,225 B2* | 1/2014 | Nzumafo | ................ | H04L 51/36 455/414.1 |
| 2009/0098856 A1* | 4/2009 | Hsu | ......................... | H04M 1/66 455/410 |
| 2009/0109458 A1* | 4/2009 | Nagata | ............... | H04N 1/32144 358/1.9 |
| 2010/0304705 A1* | 12/2010 | Hursey | .................. | H04M 11/04 455/404.1 |
| 2012/0309365 A1* | 12/2012 | Wang | .................... | H04M 3/436 455/414.1 |
| 2013/0203397 A1* | 8/2013 | Vidal | .................... | H04W 12/06 455/418 |

(Continued)

*Primary Examiner* — Santiago Garcia
(74) *Attorney, Agent, or Firm* — Novick, Kim & Lee, PLLC; Allen Xue

(57) ABSTRACT

System and method for intelligent call blocking with block mode are provided. Said system comprises at least one of a local number database and a cloud number database, as well as a monitoring module used for monitoring the phone number of mobile terminal and preprocessing, an analyzing module used for analyzing obtained phone number by means of at least one of the local number database and the cloud number database and synthesizing marking information that is obtained by such analyzing, a displaying module used for displaying said marking information in a set area of said mobile terminal, a phone number marking module used for receiving marking information that is inputted by the user and is correlated with said phone number and delivering said marking information to the cloud number database; wherein, said local number database stores a part of or all of the phone numbers and corresponding marking information which have been verified and are stored in said cloud number database.

15 Claims, 11 Drawing Sheets

(56) References Cited

U.S. PATENT DOCUMENTS

| | | | | |
|---|---|---|---|---|
| 2014/0128047 A1* | 5/2014 | Edwards | H04L 51/12 | 455/415 |
| 2014/0161243 A1* | 6/2014 | Contreras | H04M 3/56 | 379/202.01 |
| 2014/0173700 A1* | 6/2014 | Awan | H04L 63/107 | 726/4 |
| 2014/0219430 A1* | 8/2014 | Daniel | H04M 3/436 | 379/142.05 |
| 2014/0274000 A1* | 9/2014 | Gosselin | H04M 3/4365 | 455/415 |
| 2014/0335902 A1* | 11/2014 | Guba | H04W 4/027 | 455/456.4 |
| 2014/0341367 A1* | 11/2014 | You | H04L 67/1097 | 379/265.09 |
| 2015/0087280 A1* | 3/2015 | Farrand | H04M 3/436 | 455/415 |

* cited by examiner

SYSTEM AND METHOD FOR INTELLIGENT CALL BLOCKING WITH BLOCK MODE

CROSS-REFERENCE TO RELATED PATENT APPLICATION

This application claims priority to Chinese Patent Application No. 201310574602.3 filed on Nov. 15, 2013, the disclosure of which is incorporated herein in its entirety by reference.

FIELD OF THE INVENTION

This invention relates to a technology for identifying and protecting phone numbers in a mobile terminal, and especially relates to a system and method for intelligent call identification and blocking with block mode.

DESCRIPTION OF THE RELATED ART

Information spreads fast in current society; private information such as cell-phone number of the terminal user is exposed through various means, and it is impossible for the user to avoid all sorts of telephone harassments.

Early anti-harassment software is capable of inquiring the home location or its service provider of a calling number of an incoming call, and informing the user. Such function is usually based on the following principle: when the calling number of the incoming call belongs to a fixed-line telephone, the home location may be identified by checking its area code; when the calling number of the incoming call is a cell-phone number, since first few numbers of a phone number issued by a certain service provider in a home location are fixed, by comparing those first few numbers of the calling number of the incoming call with first few numbers of the phone numbers issued by respective service providers at individual home locations, its corresponding home location and service provider can be determined. However, it is meaningless for the user to only acknowledge the home location or service provider, and it's not enough to avoid harassments.

With the development of intelligent cell phone, many terminal manufacturers and third-party apps providers try to use anti-harassment software; for example, telephone harassment is intercepted by setting a black list and a white list, thus the user is prevented from being interrupted unnecessarily. Such kind of anti-harassment software has to be set by the user in advance. First of all, the user adds the phone number that he/she believes to be a telephone harassment or a suspicious phone call into a mobile terminal device operated by him/her; then, when the mobile terminal device receives an incoming call, the system will extract the calling number of the incoming call, and filters the calling number of the incoming call according to a blacklist stored in such mobile terminal device. When the calling number of the incoming call is not listed in such blacklist, the system remind the user to answer the incoming call; when the calling number of the incoming call is same with a phone number in the blacklist, the system blocks such phone call. On such basis, anti-harassment software available in the market further develops equivalent functions such as "blocking empty number incoming call" and setting a white list.

However, currently those so-called intelligent interception functions normally intercept phone calls by blocking preset phone numbers when an incoming call is received. Such interception function is not only too simple in terms of protection means, but also can only intercept and protect phone numbers that once made phone call to the user or phone numbers inputted manually by the user. However, it is impossible to precaution the user about some sales calls that seems to come from a bank or a custom service center, in which case, on one hand the user is disturbed if he/she answers such phone call, while on the other hand the user would worry that some important phone calls might be missed if he/she doesn't answer such phone call. Fraud phone calls are trickier, and the caller of fraud phone call always changes its phone number after he/she has made one phone call with such phone number. Existing anti-harassment function can't enable the user be capable of identifying and intercepting new phone numbers from which the user never receives a phone call before.

Obviously, faced with continuously emerged harassing and cheating tricks, existing anti-harassment software is far from satisfying the need of the user.

SUMMARY OF THE INVENTION

An object of the present invention is to solve above problems, and to provide a system and method for intelligent identification and protection provision of phone number in a mobile terminal, which can identify identity of a contact or an unfamiliar number, and can warn of suspicious harassment phone call and suspicious fraud phone call, thus effectively guaranteeing that the terminal user can properly use the phone number identification system even in an off line state.

The present invention discloses a system for intelligent identification and protection provision of phone number in a mobile terminal, comprising a monitoring module, a analyzing module, a displaying module, a phone number marking module, and at least one of a local number database and a cloud number database located in network; wherein, said local number database stores a part of or all of the phone numbers and corresponding marking information which have been verified and are stored in said cloud number database. In said system for intelligent call blocking with block mode, said monitoring module is used for monitoring phone number that inputted in the mobile terminal by the user or the phone number from which the user receives a phone call, and preprocessing obtained phone number and then delivering the phone number to the analyzing module; said analyzing module is used for analyzing obtained phone number by means of at least one of the local number database and the cloud number database, and synthesizing marking information that is obtained by such analyzing; said displaying module is used for displaying the marking information processed by the analyzing module in a set area of said mobile terminal; said phone number marking module is used for receiving marking information that is inputted by the user and is correlated with said phone number, and delivering said marking information to the cloud number database.

According to an embodiment of the system for intelligent call blocking with block mode of the present invention, it further comprises: an interception module, for performing corresponding interception operations on phone numbers of different phone number security levels or different phone number types, according to the setting of the user.

According to an embodiment of the system for intelligent call blocking with block mode of the present invention, said marking module records data about the interception operation performed on said phone number by said interception module, and uploads the interception operation to said cloud number database; and said cloud number database stores said uploaded interception operation data, correlates such interception operation and the security level or the phone number type of the phone number; wherein as for other phone number that has same security level or same phone number type as said phone number, said cloud number database delivers said correlated interception operation data to said interception module, so that said interception module handles all the phone numbers that have same security level as said calling number of the incoming call, in light of said interception operation.

The present invention discloses a method for intelligent call blocking with block mode, wherein, said method comprises: receiving a phone number from the mobile terminal of the user, and preprocessing the phone number; analyzing the phone number by means of at least one of a local number database and a cloud number database, so as to obtain marking information corresponding to said phone number, and synthesizing the obtained marking information; feeding said marking information back to the user, performing an operation on said phone number instructed by the user according to the feedback marking information, receiving marking information actively marked by the user and associated with said phone number, and uploading the inputted marking information to said cloud number database for saving.

According to an embodiment of the method for intelligent call blocking with block mode of the present invention, the user performs corresponding interception operation on said phone number, according to different phone number security levels or different phone number types in said marking information.

According to an embodiment of the method for intelligent call blocking with block mode of the present invention, said corresponding interception operation on said phone number comprises: recording data about the interception operation on said phone number, uploading the interception operation data to said cloud number database, and establishing correlation between said interception operation and the security level or the phone number type of said phone number, so that the same interception operation is performed on other phone numbers that have same security level or same phone number type as said phone number.

Compared with the prior art, based on the cloud number database marked actively by the user or established by a third-party, the present invention performs synchronized analysis in connection with local and cloud number databases and according to monitored phone number, so that the specific identity of the unfamiliar number can be identified and warned of; thus, the user can be prevent from be harassed by rubbish phone calls and won't miss any important phone call. In the meantime, the present invention intercepts incoming calls differentially according to the phone number type or the security level of an incoming call, and thus provide the user with a hierarchy interception solution, so that the user can perform phone number protection more conveniently.

BRIEF DESCRIPTION OF THE DRAWINGS

By reading following detailed description of non-limiting embodiments with reference to the accompany figures, other features, objects and advantages of the present invention will become more obvious.

DETAILED DESCRIPTION OF THE PREFERRED EMBODIMENTS

In the following, the present invention will be further described in connection with the Figures and embodiments.

Figure 1:
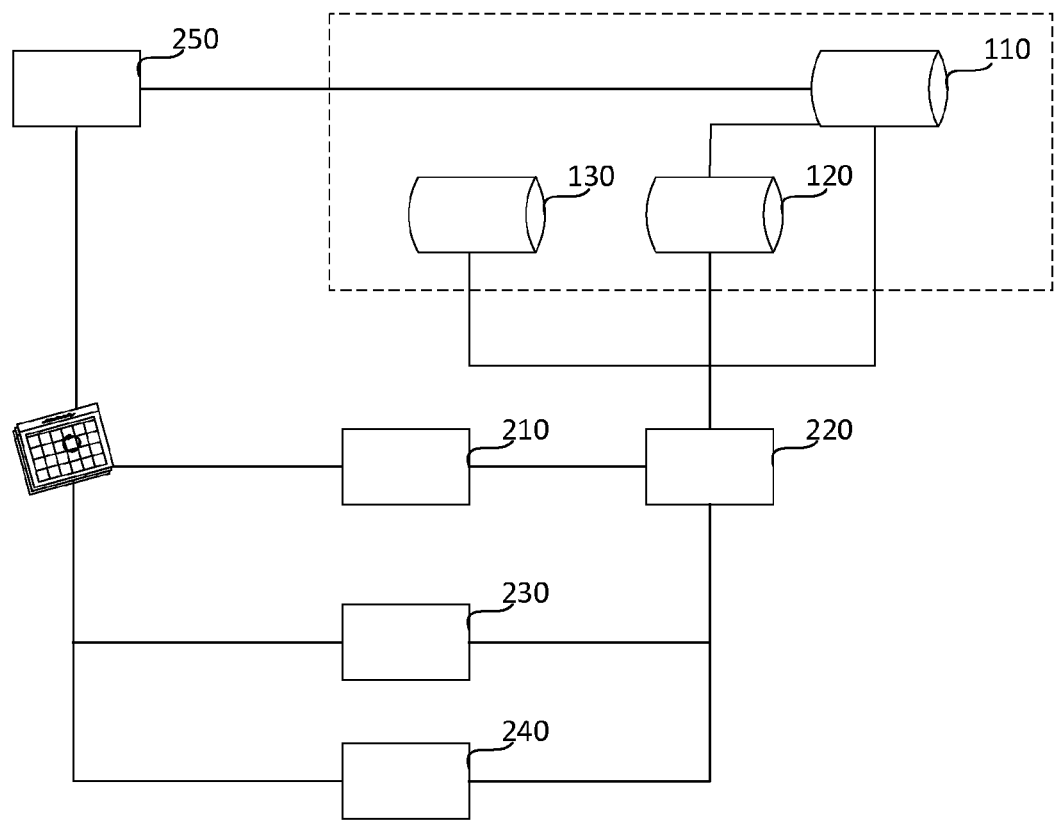
FIG. 1 shows a schematic diagram of one embodiment of the system for intelligent call blocking with block mode of the present invention.

FIG. 1 shows a principle schematic diagram of one embodiment of the system for intelligent call blocking with block mode of the present invention. Referring to FIG. 1, said system comprises a phone number database for providing phone numbers and marking information, and comprises a monitoring module 210, an analyzing module 220, a displaying module 230, an interception module 240 and a marking module 250 located at the mobile terminal.

Wherein, the phone number database may consist of a database provided by the system and a terminal contact database 130. The database provided by the system may be a cloud number database 110 located in network, or may be a local number database 120 located at the mobile terminal, or may consist of the cloud number database 110 and the local number database 120.

Specifically, the cloud number database 110 stores the phone number and associated marking information. Wherein, the marking information may include basic information of a contact or a merchant that is associated with the phone number, for example, common information (such as the name, address or social account of the contact or merchant), or extended information of a contact or a merchant associated with the phone number (for example, business information such as sales promotion offered by a merchant, sales promotion advertisement and so on), or the phone number security level information, or the phone number type, or other marking information contributed by the terminal user. After the phone number and the marking information stored in the cloud number database 110 get verification, those verified marking information are partially or wholly downloaded as the local number database 120 to be saved in the mobile terminal. The local number database 120 saved in the mobile terminal can be used in an environment where network is not available, and it can be updated periodically so as to obtain updated verified phone number in the cloud number database 110, thus keeping being synchronized with the cloud number database 110;

thus, it is guaranteed that the terminal user can use it even in a network-unconnected state.

The terminal contact database 130 is suitable for storing contact phone numbers and associated marking information saved and recorded in the mobile terminal by the user; and those phone numbers are only stored in the mobile terminal, and are not uploaded onto the cloud database for sharing with other users. Since the phone number and associated marking information recorded in the terminal contact database 130 are all inputted by the user, they are allowed by the user, and thus have high security.

The monitoring module 210 monitors the phone number inputted in the mobile terminal by the terminal user, pre-process the obtained phone number, and then outputs it to the analyzing module 220. For example, the obtained phone number may be transformed into a unified format; for example, the country code and area code may be deleted, or, the obtained phone number may be changed to have a same length, and so on.

Then, the analyzing module 220 synthesizes the marking information obtained in at least one of the terminal contact database 130, the local number database 120 and the cloud number database 110.

Figure 2:
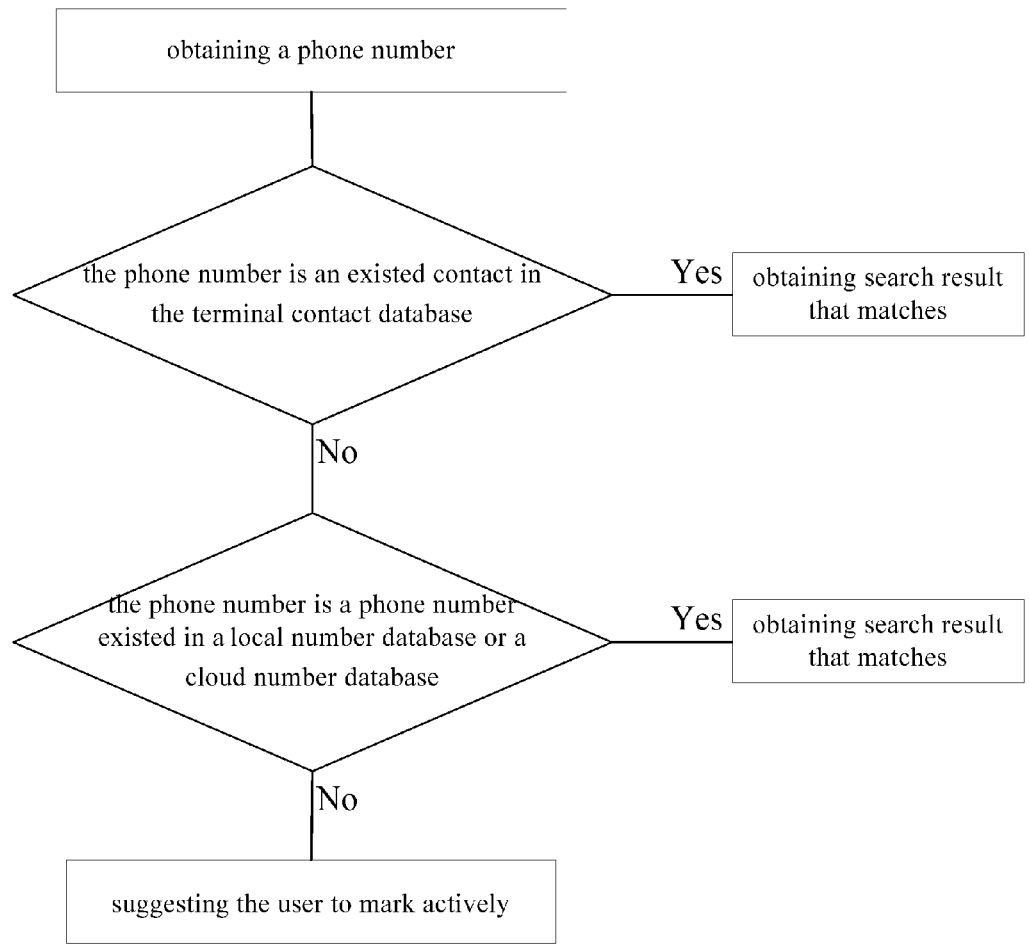
FIG. 2 to FIG. 5 shows schematic diagram showing the inquiry of the marking information based on the terminal contact database, the local number database and the cloud number database in a specific embodiment of the system for intelligent call blocking with block mode of the present invention.
Figure 3:
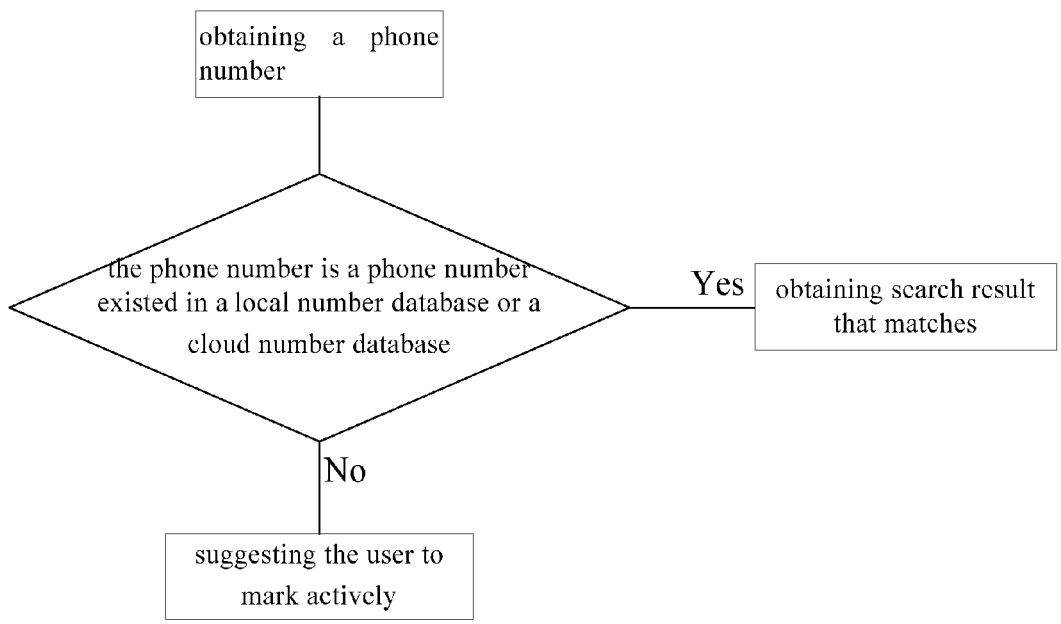

In an embodiment, referring to FIG. 2, the analyzing module 220 firstly delivers the obtained phone number to the terminal contact database 130 for inquiring whether it belongs to an existing contact; and if it belongs to an existing contact, then a matched result is obtained. When the terminal contact database 130 does not have a matched result of the phone number, the analyzing module 220 further delivers the phone number to the local number database 120 and/or the cloud number database 110 for inquiring process. In another embodiment, referring to FIG. 3, the analyzing module 220 may also firstly deliver the phone number to the local number database 120 and/or the cloud number database 110 for inquiring process.

Figure 4:
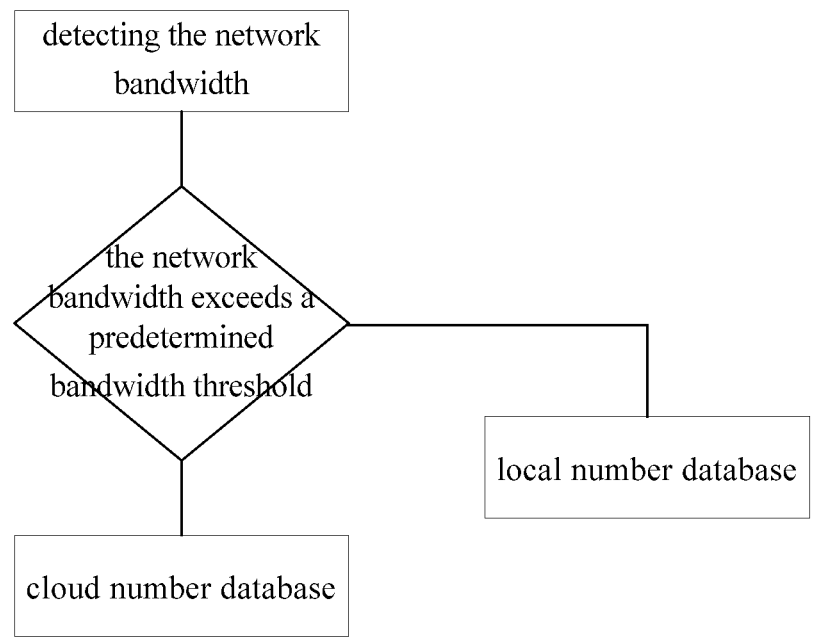
Figure 5:
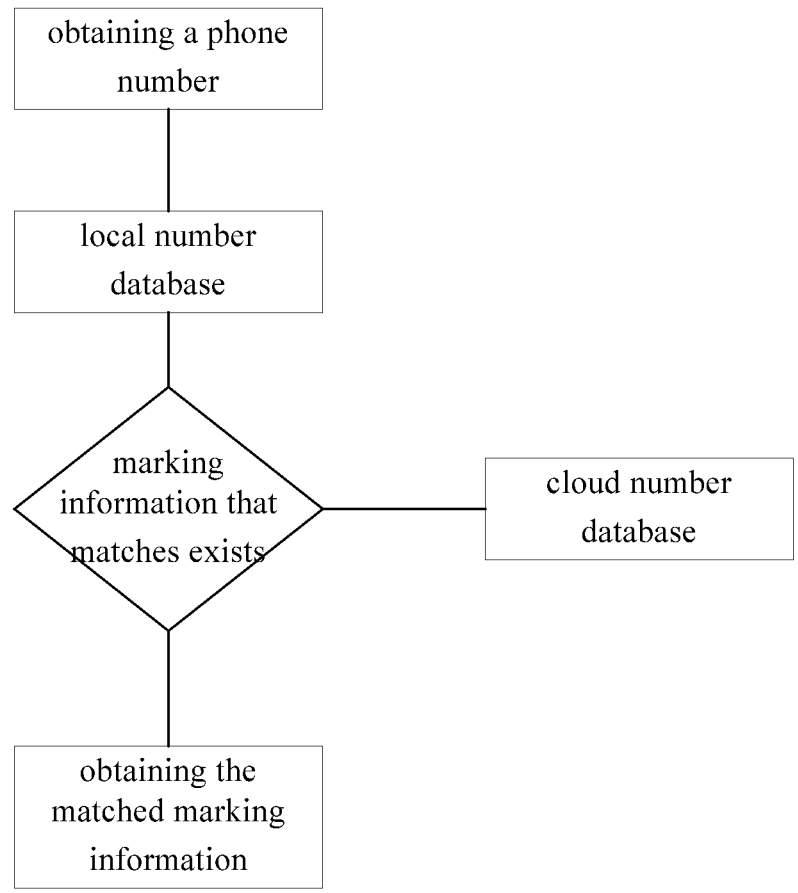

In an embodiment, the network bandwidth may be detected, and the inquiring process is chosen to be performed based on the local number database 120 or based on the cloud number database 110, according to the detecting result. For example, referring to FIG. 4, a predetermined bandwidth threshold may be set; and when it is determined that the network bandwidth exceeds the predetermined bandwidth threshold, the cloud number database 110 is automatically connected to perform inquiring process on the phone number; on the contrary, the local number database 120 is connected to perform inquiring process. Also, for example, referring to FIG. 5, the local number database 120 is preferentially used to inquire and analyze the marking information; and when no matched result is fed back or information is not complete, a prompt message of connecting to network or a prompt message of connecting the cloud number database 110 for analyzing process will be displayed, and two analyzing results will be synthesized together to provide the user with more comprehensive phone number information.

Wherein, with respect to the phone number of a contact that has been saved in the terminal contact database, the analyzing module 220 may further search for extended information of associated contact. With respect to an unfamiliar number that not exists in the terminal contact database 130, the analyzing module 220 obtains the marking information of the unfamiliar number according to searching result of the local number database 120 and/or the cloud number database 110.

In a specific embodiment, when the terminal contact database 130 has associated contact matched with the phone number, the analyzing module 220 searches for extended information of the contact, including the name, company/position, remarks, email address, social account and the like of the contact.

In another specific embodiment, when the phone number has matched marking information in the local number database 120 or the cloud number database 110, the analyzing module 220 obtains the marking information of the phone number in the local number database 120 or the cloud number database 110, for example basic information of a contact or a merchant associated with the phone number (for example, commonly used information such as the name of the contact, the name of the merchant, address of the merchant, social account of the contact or merchant and the like), or, for example, extended information of a contact or a merchant associated with the phone number (for example, business information such as sales promotion offered by a merchant, sales promotion advertisement and so on), or, for example the phone number security level prompt message (for example, suspicious harassment phone call, suspicious fraud phone call, verification passed and the like), or, for example the phone number type (for example, a real estate agent, a sales call, insurance managing finances, delivery service and so on), or a combination thereof. Additionally, when the phone number is successfully matched in the cloud number database 110, the analyzing module 220 may also obtain the number of terminal users who mark a certain phone number as a certain phone number type as counted in the cloud number database (for example, "20 users mark the phone number as a real estate agent").

Figure 6:
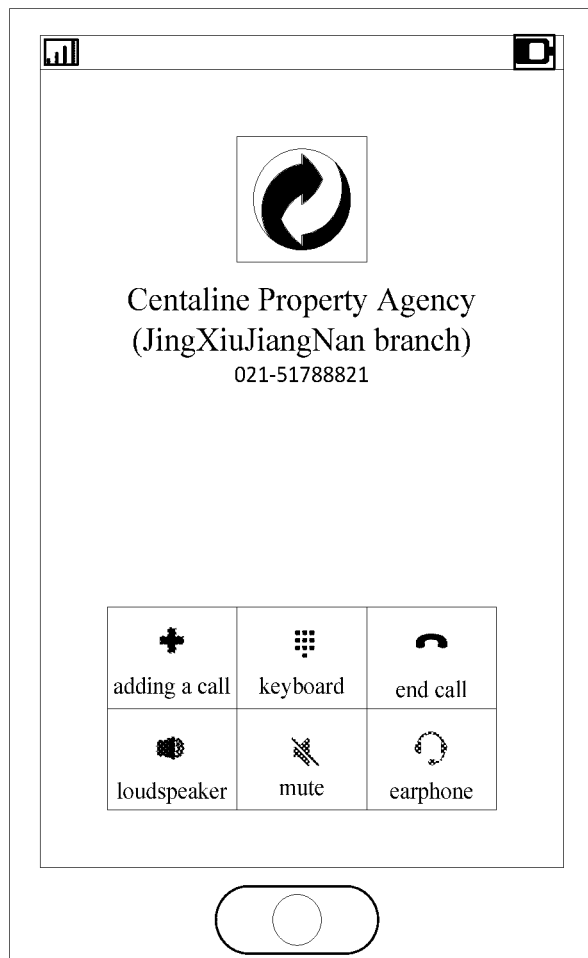
FIG. 6 to FIG. 8 are schematic diagrams showing the marking information displayed at different set positions of the mobile terminal displaying device in a specific embodiment of the system for intelligent call blocking with block mode of the present invention.
Figure 7:
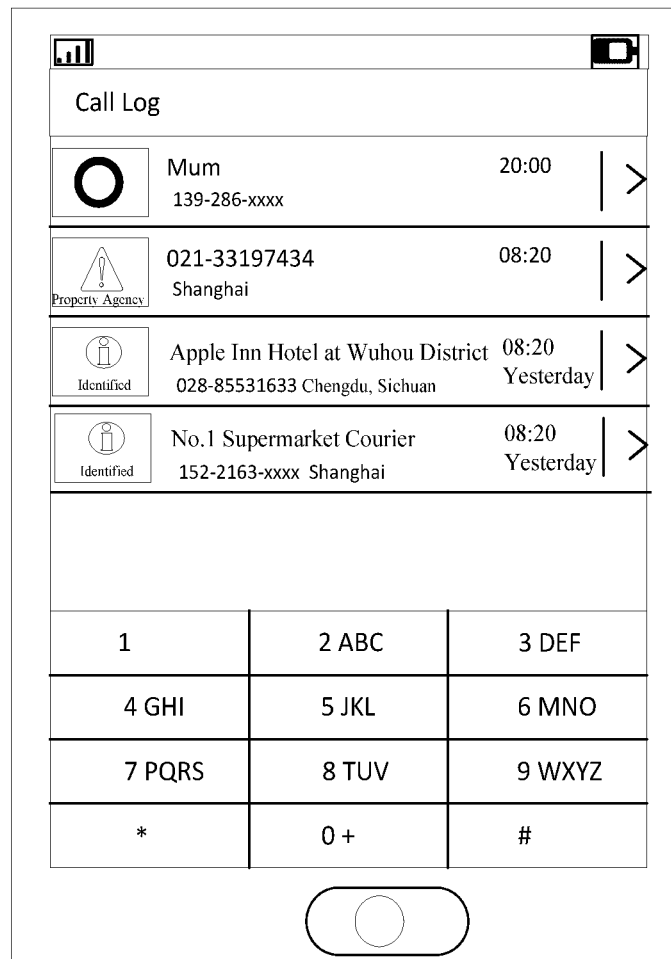
Figure 8:
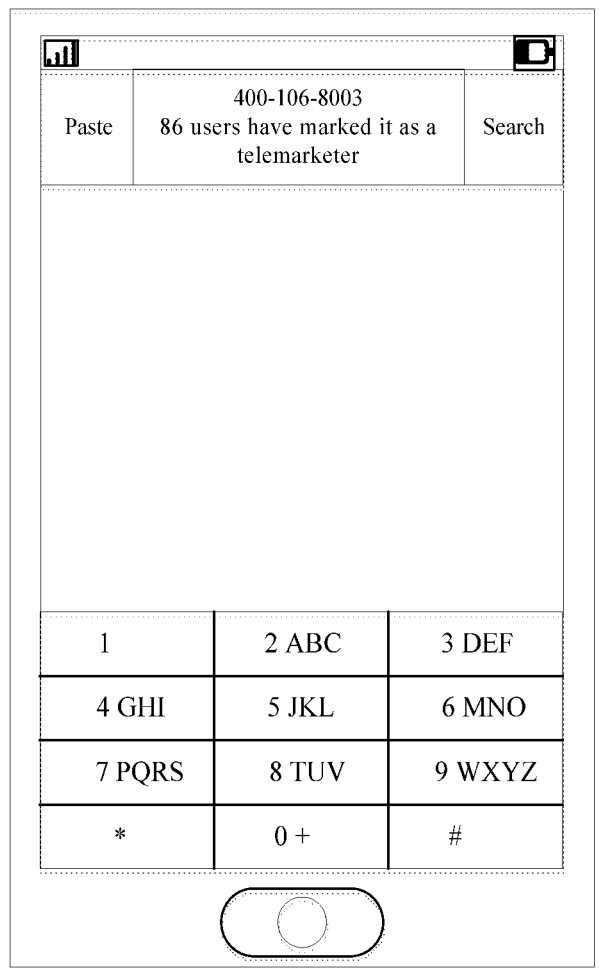

Next, the analyzing module 220 delivers the obtained marking information to the displaying module 230. The displaying module 230 displays said marking information in a set position of the mobile terminal displaying device, so as to remind the user. Wherein, referring to FIG. 6 to FIG. 8, said marking information may displayed in a call connected interface, may be displayed in the phone number entry bar, or may be displayed in call log bar.

In an embodiment, since the phone call communications of the user may be divided into two kinds (i.e. incoming call and dialed call) according to the entity who makes the call. As for a dialed call, there are several situations as follows: the user is familiar with the phone number to which the call is made and its associated merchant and contact; or, the user only know associated merchant and contact of the phone number to which the call is made, but can't make sure the truth of the phone number; or, the user is just calling back an incoming call, and totally has no idea about the phone number to which the call is made or its associated merchant and contact. As for an incoming call, the user usually can't check its source. Therefore, different processes are respectively used to handle incoming call and dialed call.

For example, as for a dialed call, when the user inputs the phone number, the displaying module 230 displays the marking information obtained by the analyzing module 220 in a dial plate or in the phone number entry bar, so that the user can know the name, type and the security level and the like of the contact or merchant associated with the phone number before a call is made, and the user can even determine on that basis whether or not to make a call, so as to avoid unwanted phone call. Wherein, according to the requirements of the user, it's possible to only identify and display unfamiliar numbers, and it's also possible to identify and display all the phone numbers. In an embodiment, first of all, the marking information is displayed; then, a call is made after the user confirms the displayed marking information. In another embodiment, after the user takes a dialing action, marking information identifying the called number of dialed call is displayed. Also, it's possible to set a time period for displaying such information, so that the identified marking information will be displayed for such set time period; or, such information is kept being displayed until the phone call ends.

Also, for example, as for an incoming call, when the user receives the calling number of the incoming call, the displaying module 230 displays the marking information obtained by the analyzing module 220 on a set position of a display screen, and the user would determine whether or not to answer the phone call according to the displayed information. Thus, the user is prevented from being disturbed by telephone harassments. Specifically, it's possible to only display unfamiliar numbers, and it's also possible to display all the phone numbers. It's possible to set a time period for displaying incoming call the marking information; for example, the marking information may be displayed when there is an incoming call, so as to help the user to decide whether or not to answer the phone call. It's also possible to display the marking information after the user hangs up, so as to prompt the user to confirm whether the marking information is accurate.

Other than the analyzed marking information is displayed on the screen, the user may also set incoming call rules to unfamiliar numbers having different security levels or phone number types via the interception module 240, according to the obtained marking information. Incoming calls with different security levels or phone number types are handled according to those incoming call rules, thus realizing more comprehensive, more humanized anti-harassment function.

For example, the cloud number database may divide the stored phone number into three security levels. Specifically, the first security level corresponds to types such as enterprise, company, merchant and the like registered with the phone number, and corresponds to those defined as commonly used phone number/public phone number by the terminal user, which have highest security level. The second security level corresponds to suspicious harassment phone calls such as selling insurance, questionnaire, and consultation promotion and so on, which have a medium security level. The third security level corresponds to suspicious fraud phone call, for example phone calls that only ring for a while before being hanged up and seduce the user to call back in order to charge extra information service fees, which have the lowest security level. Also, for example, the cloud number database may also divide the stored phone numbers into different phone number types. Specifically, the phone number type may be a real estate agent, a sales call, empty number, delivery service and so on. Additionally, the security level or the phone number type and corresponding operations of the phone number may also be further defined by the user; for example, some specific merchants may be assigned with star levels and the like according to the user' preference, and specific information of the merchant may be included, for example information about branches of the merchant.

Corresponding to different security levels or the phone number types, the user may perform different interception operations on the calling numbers of the incoming calls according to respective security levels or phone number types, by means of the interception module 240.

Figure 9:
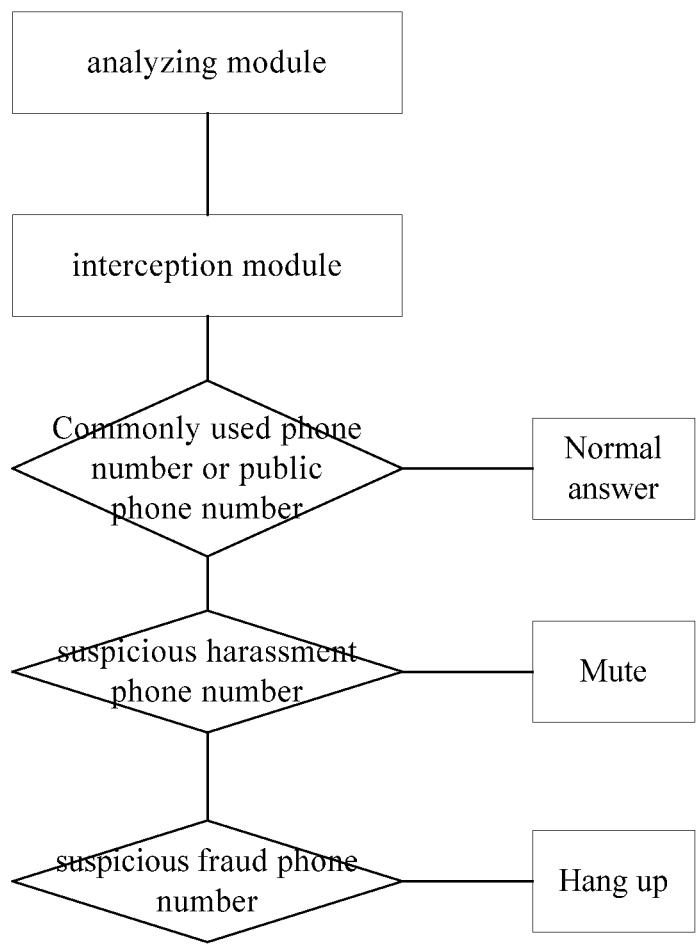
FIG. 9 shows a flow diagram showing the interception operation performed by the interception module according to the security level or the phone number type corresponding to the phone number in one embodiment of the system for intelligent call blocking with block mode of the present invention.

Specifically, referring to FIG. 9, the interception module 240 receives the marking information obtained by the analyzing module 220, and extracts the security level or the phone number type corresponding to the phone number; and then according to said security level or the phone number type, performs corresponding interception operation.

In a specific embodiment, with respect to the phone number that has been marked with a phone number type or a security level, phone numbers having such type or such security level may be assigned with a unified interception operation. For example, with respect to commonly used phone numbers or public phone numbers, normal phone communication may be conducted; for example, the user receives an incoming call from "400-699-9999" that is marked in the cloud number database as phone number of Haier custom service center, then, the phone rings regularly to prompt the user to answer the phone call. With respect to suspicious harassment phone call, such incoming call may be muted; with respect to suspicious fraud phone call, such incoming call may be hanged up directly. For example, with respect to common take-out service or delivery service, normal phone communication may be conducted; with respect to a real estate agent, setting may be made by the interception module 240 to conduct normal phone communication during a predetermined time period and to mute or directly hang up the incoming call during other time period.

Besides that the marking information corresponding to the phone number is displayed on the mobile terminal operated by the user and the incoming call is intercepted, the user may also actively makes a mark by means of the marking module 250, and uploads and stores the actively made mark and its associated interception operations to said cloud number database.

Specifically, as for an unfamiliar number that already has been marked, when the user disagrees with the displayed marking information and the user actively makes a mark, or when the user actively makes a mark to an unfamiliar number that already has not been marked, the marking module 250 records the mark actively made by the user and uploads it to said cloud number database. When the uploaded mark that was actively made passes verification, the cloud number database 110 takes the information of such mark that are actively made as updated marking information so as to update the phone number.

The marking module 250 may also record and update data about the user's associated operation of the calling number of the incoming call. Specifically, as for the calling number of the incoming call, the marking module 250 may record the security level or the phone number type of the calling number of the incoming call, detects and records the user's operation of the calling number of the incoming call, and updates the phone number and data about the user's operation of the phone number to said cloud number database 110; the cloud number database 110 stores the updated data about such operation, and correlates such operation with the security level or the phone number type of the phone number. When the user receives other incoming call having a phone number that have same security level or same phone number type as such phone number, the cloud number database 110 sends the associated operation to the interception module 240 of the mobile terminal, so that the interception module 240 automatically handles all the phone numbers having a security level as same as that of said calling number of the incoming call according to such associated operation as recorded.

Figure 10:
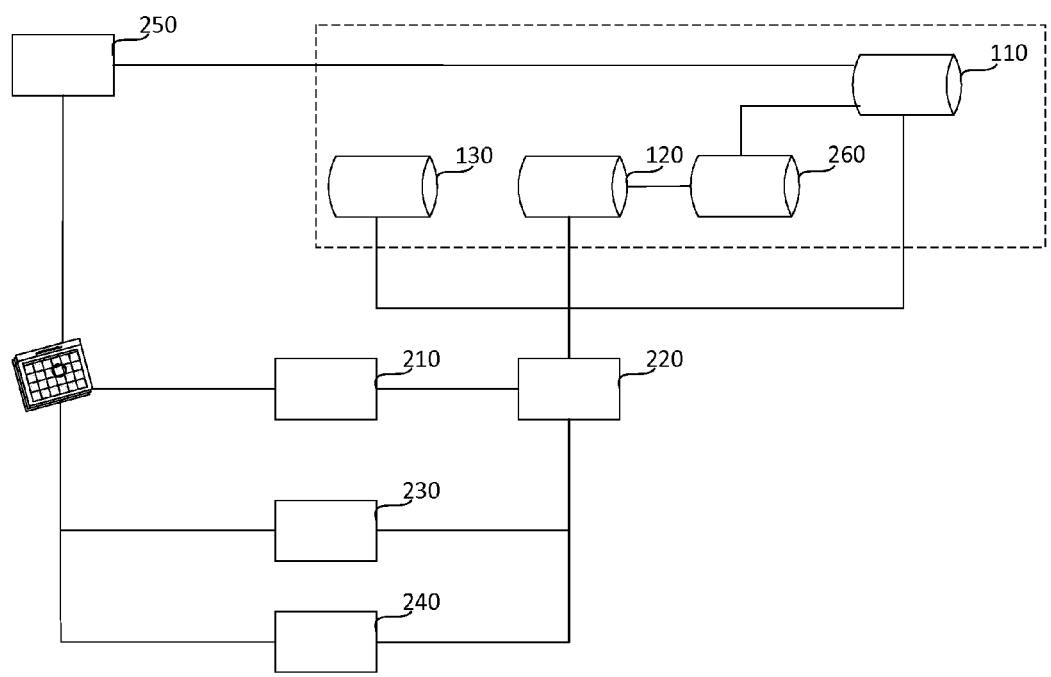
FIG. 10 shows a schematic diagram of another embodiment of the system for intelligent call blocking with block mode of the present invention.

Referring to FIG. 10, Figure shows a principle schematic diagram of another embodiment of the system for intelligent call blocking with block mode of the present invention. Wherein, said system further comprises: a verification module 260. The verification module 260 is used to process the marking information fed back by the client terminal, only marking information that has been verified to be accurate, can be stored in the cloud number database as the marking information of the phone number.

Specifically, there are many verification methods.

In an embodiment, for example, if the times that said phone number is marked as certain marking information exceed a predetermined threshold, the marking information passes the verification. For example, when times that a certain phone number is marked as a real estate agent exceeds the predetermined threshold (for example, 300 peoples mark it as a real estate agent), the phone number is verified as a real estate agent. For example, in another embodiment, when the times that a certain phone number is marked as certain marking information during a predetermined time period exceeds a predetermined threshold, the marking information passes the verification. For example, as for a fraudster, he/she usually frequently calls multiple users during a time period to practice fraudulent act; if during one day, times that such marking information is marked to the phone number exceeds the predetermined threshold, the phone number is verified as a fraudster. For example, in yet another embodiment, different marking information weights may be assigned to different credit rating of different users, and credit degree of the marking information is calculated according to weights. When the credit degree of the marking information reaches a predetermined threshold, it passes the verification. For example, different credit ratings may be set to a user according to the previous marking result of the user; when marking information of the phone number is counted, the credit rating of the user who provides such marking information is also counted, and the counted credit degree is compared with a predetermined threshold, then whether or not it passes verification is determined based on the comparison result. For example, when credit degree of the marking information exceeds a predetermined threshold, it passes the verification.

During above verification procedure, when the user makes marks, the verifying device may upload the device information of the user, and takes it as unique code for the identity of the marking information provider. When the same user makes multiple times of correcting marking to a same phone number, the system will only accept the marking correcting information once. Additionally, the verifying device may also upload the geographic position information about where the user is currently located. When the user marks a phone number as a nationwide merchant, the system will automatically add its geographic position information onto the marking information, so that more accurate matching is possible. Also, for example, the verification process can also be performed further in connection with a database of a third-party system.

The phone number and its associated marking information or associated interception operation which are stored in the cloud number database 110 and are verified may be downloaded into the mobile terminal of the terminal user, as the local number database of the mobile terminal, so that service can be provided to the user in an off line state.

Figure 11:
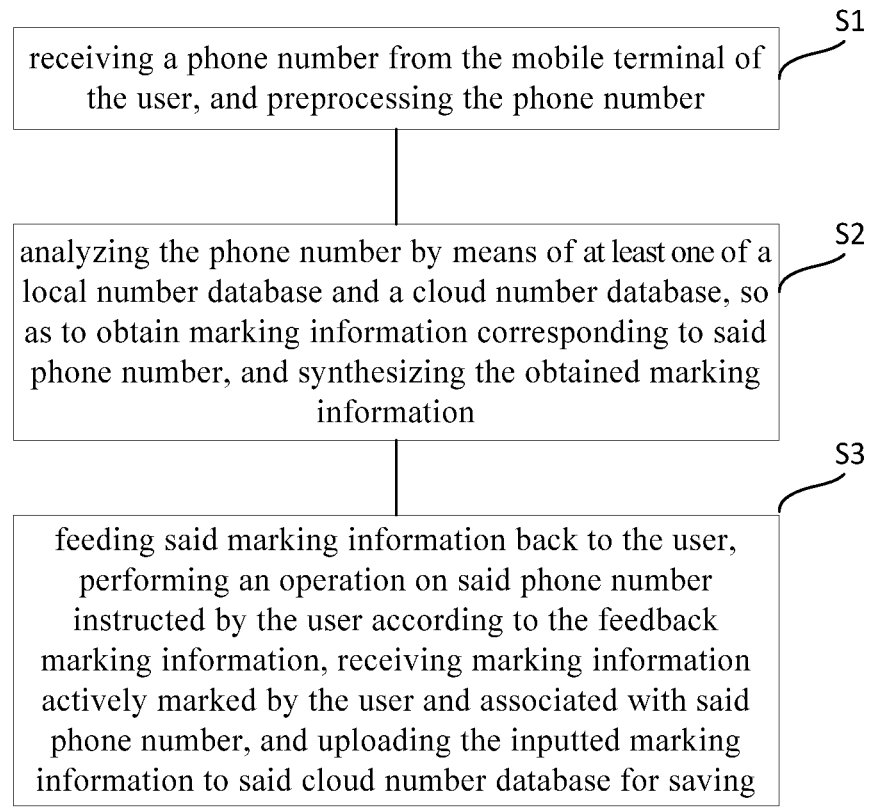
FIG. 11 shows a flow diagram of one embodiment of the method for intelligent call blocking with block mode of the present invention.

The present invention also provides a method for intelligent protection of the mobile terminal communication by means of above system. In a specific embodiment, referring to FIG. 11, said method comprises: a step S1, for receiving a phone number from the mobile terminal of the user, and preprocessing the phone number; a step S2, for analyzing the phone number by means of at least one of a local number database and a cloud number database, so as to obtain marking information corresponding to said phone number, and synthesizing the obtained marking information; a step S3, for feeding said marking information back to the user, performing an operation on said phone number instructed by the user according to the feedback marking information, receiving marking information actively marked by the user and associated with said phone number, and uploading the inputted marking information to said cloud number database for saving.

Above embodiments are proved to a person skilled in the art for illustrating how to implementing and making use of the present invention. A person skilled in the art can make all kinds of modifications and variations to above embodiments, without departing from the inventive concept of the present invention. Thus, the protection scope of the present invention is not limited to above embodiments, and is consistent with the broadest scope of the inventive features of the claims.

The invention claimed is:

1. A system for intelligent call blocking with block mode on a mobile terminal, comprising: a monitoring module, an analyzing module, an interception module, a displaying module, a phone number marking module, a verification module, and at least one number database selected from a group consisting of a local number database located in the mobile terminal and a cloud number database located in network, wherein said number database stores a plurality of stored phone numbers, each stored phone number having a marking information associated therewith, wherein said monitoring module receives an incoming phone number, said incoming phone number being inputted into the mobile terminal by a user or being extracted from an incoming phone call, preprocesses the incoming phone number and delivers the incoming phone number to the analyzing module, wherein said analyzing module compares the incoming phone number with the plurality of stored phone numbers stored in at least one of the local number database and the cloud number database, when the incoming phone number matches a stored phone number, assigning to the incoming phone number the marking information associated with the stored phone number, said marking information comprises a phone number security level, wherein the interception module performs an interception operation on the incoming phone number according to the phone number security level extracted from the marking information assigned to the incoming phone number, wherein said displaying module displays the marking information generated by the analyzing module in a pre-determined area of said mobile terminal, wherein said phone number marking module records a new marking information inputted by the user, and uploads said new marking information to the cloud number database so that the new marking information becomes a stored marking information, wherein said verification module comprising a calculator and a comparator and verifies the marking information as accurate or not, wherein the calculator calculates a credit degree of the marking information or records a number of times the same marking information is marked by the user, and wherein the comparator compares the credit degree with a first pre-determined threshold value or compares a number of times the same corresponding marking information is marked with a second pre-determined threshold value.

2. The system for intelligent call blocking with block mode according to claim 1, wherein said marking information further comprises a phone number security level prompt message, a phone number type, and a number of terminal users that have marked the phone number.

3. The system for intelligent call blocking with block mode according to claim 2, wherein said phone number marking module records the phone number security level, detects and records a user's interception operation on the phone number and uploading said interception operation and said phone number security level to the number database, so that said interception operation is matched with said phone number security level.

4. The system for intelligent call blocking with block mode according to claim 3, wherein said marking module records data of the interception operation performed on said incoming phone number by said interception module, and uploads the interception operation to said number database,
wherein said number database stores said uploaded interception operation data, correlating said interception operation data with the phone number security level or a phone number type of the incoming phone number;
wherein said number database assigns a same interception operation data to phone numbers that have a same phone number security level or a same phone number type, and deliver the same interception operation data to said interception module, so that said interception module perform the same interception operation on all the phone numbers that have the same phone number security level or the same phone number type.

5. The system for intelligent call blocking with block mode according to claim 1, further comprising a terminal contact database located at the mobile terminal that stores phone numbers and corresponding marking information recorded by the user through the mobile terminal.

6. The system for intelligent call blocking with block mode according to claim 5, wherein said analyzing module firstly delivers the incoming phone number to said terminal contact database for an inquiring process, and when there is no matched result for the incoming phone number, further performs inquiring process on the incoming phone number according to said at least one number database.

7. A method for intelligent call blocking with block mode, comprising:
receiving an incoming phone number inputted in the mobile terminal by a user or received by the mobile terminal;
comparing the incoming phone number with stored phone numbers stored in at least one number database selected from the group consisting of a local number database and a cloud number database, wherein each of the stored information are associated with a marking information;
when the incoming phone number matches a stored phone number, obtaining a marking information corresponding to said stored phone number;
verifying an accuracy of the marking information;
informing the user said marking information, wherein said marking information comprises a phone number security level of the incoming phone number; and
performing an interception operation on the incoming phone number according to the phone number security level or a phone number type thereof,
wherein, in the verifying step, when a number of times that the incoming phone number is marked with the same marking information exceeds a first predetermined threshold, verifying the marking information as accurate;
when a number of times that the incoming phone number is marking with the same marking information during a predetermined time period exceeds a second predetermined threshold, verifying the marking information as accurate; and
when a credit degree of the marking information exceeds a third predetermined threshold, verifying the marking information as accurate, wherein the credit degree is calculated based on weights of users making the marking information.

8. The method for intelligent call blocking with block mode according to claim 7, wherein the marking information associated with the stored phone number further comprises a phone number type, and/or a number of terminal users that have marked the stored phone number.

9. The method for intelligent call blocking with block mode according to claim 8, further comprising amending the phone number security level and the interception operation associated therewith by the user.

10. The method for intelligent call blocking with block mode according to claim 9, further comprising: recording data about the interception operation on said incoming phone number, uploading the interception operation data to said number database, and establishing correlation between said interception operation and the phone number security level or the phone number type of said incoming phone number so that the same interception operation is performed on other phone numbers that have same phone number security level or same phone number type as said incoming phone number.

11. The method for intelligent call blocking with block mode according to claim 7, further comprising arranging a terminal contact database located in the mobile terminal for storing phone numbers and corresponding marking information recorded by the user through the mobile terminal.

12. The method for intelligent call blocking with block mode according to claim 11, further comprising comparing the incoming phone number with stored phone numbers stored in the terminal contact database.

13. The system for intelligent call blocking with block mode according to claim 3, further comprising a terminal contact database located in the mobile terminal for storing phone numbers and the marking information recorded by the user through the mobile terminal.

14. The system for intelligent call blocking with block mode according to claim 1, wherein said local number database stores a plurality of stored phone numbers, each stored phone number having a verified marking information associated therewith.

15. The system for intelligent call blocking with block mode according to claim 1, wherein the phone number security level and the interception operations corresponding thereto is amendable by the user.

* * * * *